UNITED STATES PATENT OFFICE.

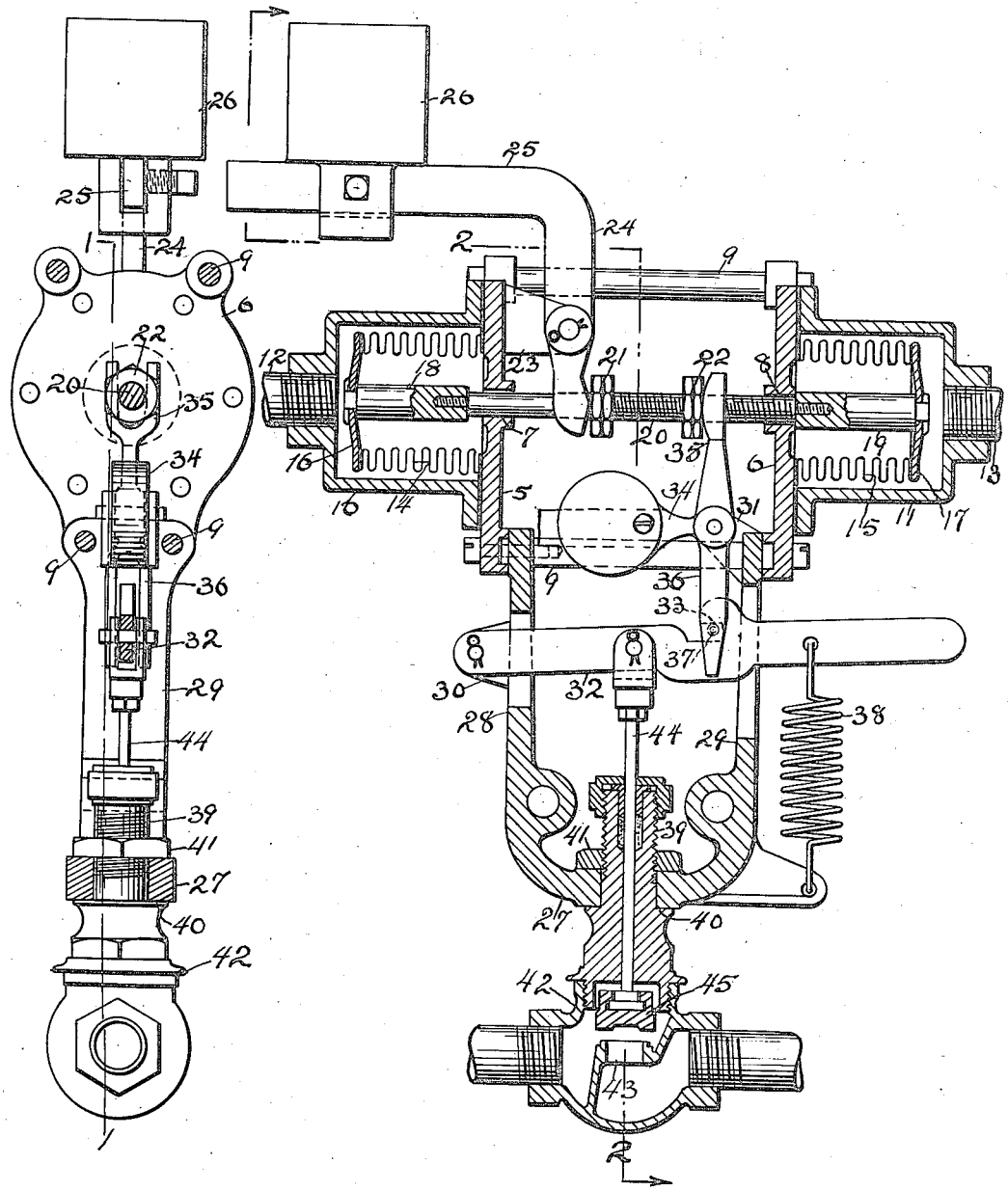

JOHN W. F. MACDONALD, OF BRIGHTON, MASSACHUSETTS, ASSIGNOR TO THE MERRILL PROCESS COMPANY, A CORPORATION OF MASSACHUSETTS.

AUTOMATIC VALVE CONTROL.

1,299,850.

Specification of Letters Patent. Patented Apr. 8, 1919.

Application filed December 5, 1918. Serial No. 265,387.

*To all whom it may concern:*

Be it known that I, JOHN W. F. MACDONALD, a citizen of the United States, and a resident of Brighton, in the county of Suffolk and State of Massachusetts, have invented Improvements in Automatic Valve Controls, of which the following is a specification, reference being had to the accompanying drawings, forming part thereof.

This invention has reference to an improved mechanism whereby the operation of valves may be controlled by or through a variation in pressure of fluid caused by expansion of said fluid by an increase of temperature, by mechanical pressure exerted on said fluid, or in any known manner. This application for patent is in part for subject matter disclosed in my application filed February 8, 1918, Serial No. 216,142, on which Patent No. 1,278,068 was granted September 3, 1918.

One object of this invention is to improve the construction of the mechanism which normally retains the valve actuating member from operation.

Another object of the invention is to so construct valve controlling mechanism of the nature herein described that a normally comparatively high pressure acting against one actuator element of the mechanism may be so balanced as to be readily overcome by the thermostatic expansion of fluid acting against another element of said mechanism.

Other objects of the invention will appear from the following description.

The invention consists in the pressure actuated means and the balancing means therefor.

The invention also consists in such other novel features of construction and combination of parts as shall hereinafter be more fully described and pointed out in the claims.

Figure 1, represents a sectional view of the improved valve controlling mechanism, as taken on line 1—1 Fig. 2.

Fig. 2, represents a similar view taken on line 2—2 Fig. 1.

Similar characters of reference designate corresponding parts throughout.

As shown in the drawings 5 and 6 represent frame plates having perforations 7 and 8 and spaced apart and secured on the bolts 9, 9. Plates 5 and 6 respectively have the chambers 10 and 11 furnished with the pipes 12 and 13 which may represent the pipes 18, 19 of my said patent or may be any pipes adapted to be filled with air, liquid or any other suitable fluid medium which in itself or through some additional means may be subjected to a variation in its pressure exerting tendency. Within the respective chambers 10 and 11 are mounted the bellows members 14 and 15 having the rigid heads 16 and 17 furnished with the inwardly extending stems 18 and 19 of diameters larger than the perforations 7 and 8, of plates 5 and 6, said stems 18 and 19 being connected by the screw threaded rod 20 adapted to slide in said perforations 7 and 8 and having adjustable on its screw thread the nuts 21 and 22.

Extending from frame plate 5 is the bracket arm 23 which carries a pivot on which the arm 24 of lever 25 is mounted. Arm 24 acts against nut 21 with a pressure determined by the adjustment of weight 26 on arm 25 to balance or to partially balance the pressure exerted on head 17 of bellows member 15.

Depending from the lower pair of bolts 9, 9 between plates 5 and 6 is a frame having the lower member 27 and the slotted members 28, 29 of which member 28 has the bracket arm 30 and member 29 has the bracket arm 31. On a pivot of bracket arm 30 is pivotally mounted the lever 32 which extends through the slots of said members and at its upper portion has the hook or finger 33. On a pivot of bracket arm 31 is pivoted the counter-weighted retaining and release lever 34 having the upstanding arm 35 bearing against the nut 22 and the depending arm 36 having near its lower end the retaining pin or bearing member 37 which is engaged with the hook or finger 33 of lever 32; the swinging of lever 34 by its counterweight is or may be limited by said pin or bearing 37 contacting with a wall of said hook or finger 33 in coöperation with the bearing of arm 35 of retaining and release lever 34 against nut 22 depending upon the adjustment of nut 22 on rod 20. Provision is made to swing lever 32 downward, when released by the pin or bearing 37, by means of spring 38 connected with said lever 32 and with the arm fixed on said frame member 27.

At the lower portion of said frame member 27 is a vertical opening through which extends the axially perforated exteriorly screw threaded guide member 39 having the shoulder 40 which guide member is secured in place by the nut 41 and, at the lower portion, said guide member 39 is secured to the valve chamber 42 having the valve seat 43 or any other suitable valve seat. Slidable in the bore or perforation of guide 39 is the rod 44 which at its upper end is pivotally connected with lever 32 and at its lower end has the valve 45 adapted to close against valve seat 43.

Various arrangement and specific uses of the parts shown may be made without changing the invention materially. For instance, pipe 13 and chamber 11 may be connected with a conduit supplied with high pressure which acts against head 17 of bellows 15, such pressure being balanced partially by weighted arm 24, 25 acting against nut 21 of rod 20 and partially by pressure acting against head 16 of bellows 14 in chamber 10. If the ratio of pressure in said chambers 10 and 11 varies sufficiently from the normal either by the failure or reduction of pressure in chamber 11 or by an undue increase of pressure in chamber 10 the heads 16 and 17 with the stems 18 and 19 and rod 20 will be shifted in a direction whereby nut 22 will act to swing lever 35, 36 in a direction to release bearing pin 37 from hook 33 to permit the swinging of lever 32, by spring 38, to move rod 44 in the valve closing direction.

In some cases, when it is proposed to close valve 45 solely by reason of a failure of pressure in chamber 11 and pipe 13, the bellows 14 and its head 16 may be omitted. In other cases when it is desired to effect the closing of valve 45 thermostatically, by the expansion of air or other expansible medium in chamber 10 supplied with heat from any source, bellows 15 and its head 17 may be omitted and weighted arm 24, 25 may also be dispensed with, the counterbalancing of normal fluctuations in pressure in chamber 10 being, in some degree, compensated for by the counterweighted arm 35 of the retaining and release lever 34 acting against nut 22 of rod 20.

While I have herein shown and described a somewhat specific embodiment of this invention it is not my intention thereby to limit the invention except as herein claimed.

Having thus described my invention I claim as new and desire to secure by Letters Patent—

1. Valve controlling means comprising a valve actuating lever, a pivoted weighted means to retain said lever from operation, a slide rod, to actuate said means, having heads, and pressure chambers in which said heads operate.

2. Valve controlling means comprising a valve actuating lever, a pivoted means to retain said lever from operation, a slide rod having heads, a pair of chambers in which said heads operate, adjustable means on said rod to act on said pivoted means, and a pivoted counterweight lever acting to move said slide rod in one direction.

3. Valve controlling means comprising a valve actuating lever, a pivoted means to retain said lever from operation, a slide rod having a head, a pressure chamber in which said head may operate, and a counterweight means acting on said rod to balance pressure on said head.

4. Valve controlling means comprising a pivoted valve actuating lever having a hook member, a pivoted counterweighted retaining lever having a bearing to swing into and out of engagement with said hook member, a pressure actuated slide rod, and a nut adjustable on said rod against which a member of said retaining lever acts.

5. Valve controlling means comprising a frame carrying a guide, a valve rod slidable in said guide, a spring actuated lever pivotally mounted in said frame and having a hook, a counterweighted lever pivotally mounted on a member of said frame and having a pin normally in engagement with said hook, a pair of pressure chambers mounted at the upper portion of said frame, a screw threaded rod slidable in openings of the walls of said chambers and having, within said chambers, bellows having heads, nuts adjustable on the screw thread of said rod, one said nut acting against a member of said counterweighted lever, and a counterweighted lever pivotally mounted at the upper portion of said frame and acting against the other said nut.

JOHN W. F. MACDONALD.